Feb. 12, 1963 W. R. DAPPRICH 3,076,990
ROTARY WIPER
Filed March 23, 1962
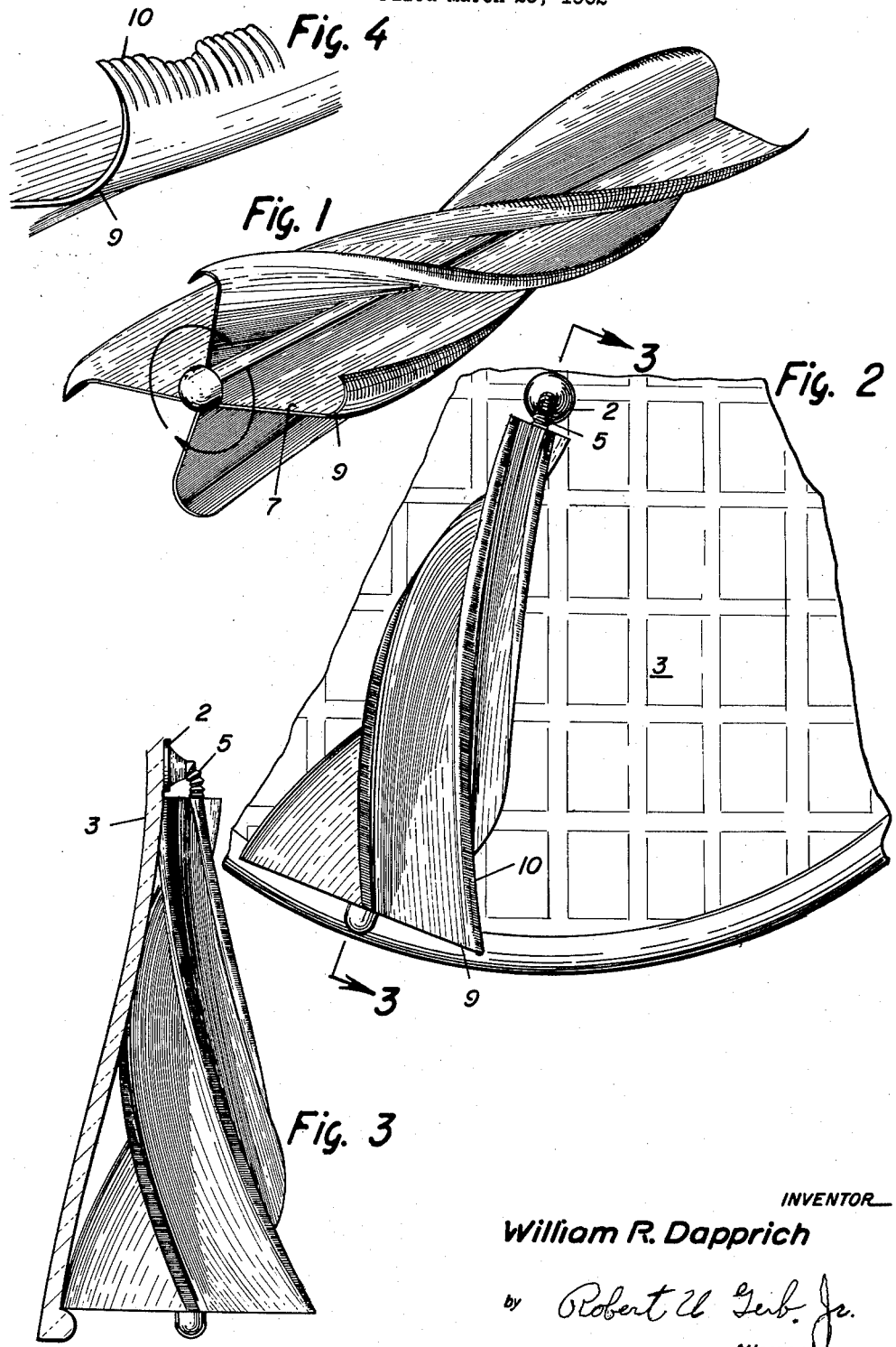
INVENTOR_
William R. Dapprich
by Robert U. Geib, Jr.
Attorney United States Patent Office
3,076,990
Patented Feb. 12, 1963

3,076,990
ROTARY WIPER
William R. Dapprich, 355 Hahn Drive,
Canonsburg, Pa.
Filed Mar. 23, 1962, Ser. No. 181,848
4 Claims. (Cl. 15—250.22)

This invention relates to a rotary wiper, and more particularly to a rotary wiper which is adapted to clean and wipe the front glass or lens of a vehicular headlight, and which is operated by air currents resulting from the movement of the vehicle.

While satisfactory wipers have long been provided as standard equipment for cleaning the front windshields of vehicles, I am aware of no prior art device which will satisfactorily clean the front glass or lens of a vehicular headlight while the vehicle is in motion.

With the increase of high road speeds on city streets and superhighways, the importance of good lighting for safety's sake cannot be underestimated. In the course of driving in slushy or sloppy weather, dirt-filled spray contacts the vehicle's headlight lenses, and, after drying, forms a coating which gradually diminishes the amount of light which may be transmitted therethrough, thereby decreasing visibility of the road and causing many accidents and near-accidents.

Due to the fact that practically all modern vehicular headlights utilize a front glass or lens which is concavo-convex, it has been difficult to provide some sort of power means for effectively moving a cleaning wiper across the outer face thereof.

It is among the objects of the present invention to provide a wiper element of the class described which will effectively and continuously clean and wipe a headlight lens by being driven solely by air currents resulting from the forward movement of the vehicle.

Another object of the invention is the provision of an inexpensive and durable wiper which may be easily secured to the center of the surface to be cleaned, and which is so constructed as to take full advantage of the air currents flowing over said surface.

Still another object is to alleviate the accumulation of dirt, etc., on the surfaces of the type referred to by providing a pendant multi-vaned brush of suitable material supported at the headlight center by a vacuum cup or pressure-sensitive pad of material attached to the brush in such a manner as to permit the 360° rotation of this brush in a circular fashion over the face of the headlight lens, the action of said brush being to rotate on its own axis, as well as rotating circularly on the surface of the headlight lens.

The invention, then, comprises the features hereinafter fully described and as particularly pointed out in the claims, the following description and the annexed drawings setting forth in detail certain illustrative embodiments of the invention, these being indicative of some of possibly several ways in which the principles of the invention may be employed.

In said drawings:

FIGURE 1 is a perspective of an elongate wiper element embodying the teachings of the present invention, the view being taken from a position adjacent the outer end of the wiper element;

FIGURE 2 is a fragmentary front elevation of a conventional vehicular headlight and illustrating the novel rotary wiper of the invention as attached thereto in operative position;

FIGURE 3 is a sectional view taken on the line 3—3 of FIGURE 2; and

FIGURE 4 is an enlarged fragmentary perspective which more clearly illustrates the shape and relationship of the bristles of the wiper element.

Referring more particularly to the drawings, the numeral 2 (see FIGURES 2 and 3) designates a live rubber suction cup which is readily attachable to the center of a headlight lens, the latter being shown at 3. A short length of live rubber cord 5 is molded to the center of the outer surface of the small suction cup 2.

The elongate wiper or brushing element 7 is attached to the rubber cord 5, its length being preferably one-half the diameter of the headlight lens. This wiper or brushing element 2 can be made of a number of suitable materials, including various plastics (such as nylon), metals, such as aluminum, etc.; and is provided with a series of curved vanes 9 which catch the air currents resulting from the forward movement of the vehicle and rotate the wiper in a manner which will be described hereinafter. The brush 7 is of varying diameter with the small end to the center of the headlight lens so as to maintain continuous contact with the spherical contour of the latter; and the edges of the vanes 9 are serrated or finely cut to form bristles 10.

As shown, the bristles 10 which contact the lens 3 are curved and parallel to each other. The brush or wiping element 7 cannot freely pivot due to the resistance of the rubber cord 5 to which it is attached. Accordingly, it rolls around the surface of the headlight lens; and each tiny bristle 10 abrades and mechanically loosens the particles of the dry road dirt by a scrubbing action.

The multiple vanes 9 are of such number that, when made in an involute curve which parallels the contour of the spherical headlight lens, they rotate in a relatively smooth manner. As indicated earlier herein, the resistance to the air against the inner surfaces of the vanes 9 provides the necessary power to rotate the brush. Where the headlight lenses are provided with three small glass protrusions used for adjusting the headlight alignment, a gap in the brush 7 may be provided to clear these protrusions and permit smooth rotation.

While I have shown and described several specific embodiments of the present invention, it will be readily understood by those skilled in the art that I do not wish to be limited exactly thereto, since various modifications may be made without departing from the scope of the invention as defined by the appended claims.

I claim:

1. In an air-driven wiper for removing dirt from a surface which is exposed to air currents; a supporting element adapted for attachment to the approximate center of the surface to be cleaned; a flexible cord-like member non-rotatably secured to said supporting element; a multi-vaned elongate brush secured to said flexible cord-like member; the outer portions of the vanes of said elongate multi-vaned brush being of spiral formation and curved to provide an air-scooping effect; and bristles on the outer edges of said vanes.

2. In an air-driven wiper for removing dirt from a spherical surface which is exposed to air currents; a supporting element adapted for attachment to the approximate center of the spherical surface to be cleaned; a flexible cord-like member non-rotatably secured to said supporting element; a multi-vaned elongated brush secured to said flexible cord-like member; the outer portions of the vanes of said multi-vaned elongate brush being of spiral formation and curved to provide an air-scooping effect; the outer edges of said vanes forming an involute curve which conforms to the contour of the spherical surface to be cleaned; and bristles on the outer edges of said vanes.

3. In an air-driven wiper for an automobile headlight;

a supporting element adapted for attachment to the approximate center of the lens of said headlight; a flexible cord-like member non-rotatably secured to said supporting element; a multi-vaned elongate brush secured to said flexible cord-like member; the outer portions of the vanes of said elongate multi-vaned brush being of spiral formation and curved to provide an air-scooping effect; and bristles carried on the outer edges of said vanes.

4. In an air-driven wiper for an automobile headlight with a spherical lens; a supporting element adapted for attachment to the approximate center of said spherical lens; a flexible cord-like member non-rotatably secured to said supporting element; a multi-vaned elongate brush secured to said flexible cord-like member; the outer portions of the vanes of said multi-vaned elongate brush being of spiral formation and curved to provide an air-scooping effect; the outer edges of said vanes forming an involute curve which conforms to the contour of said spherical lens; and bristles on the outer edges of said vanes.

References Cited in the file of this patent

UNITED STATES PATENTS

| | | |
|---|---|---|
| 2,749,568 | Bird et al. | June 12, 1956 |
| 2,884,656 | Bryant | May 5, 1959 |